United States Patent Office 3,194,667
Patented July 13, 1965

3,194,667
METHOD FOR PACKAGING VISCOUS LIQUIDS
Ralph E. Pfister and Richard J. Lee, Midland, Mich., and Orwin G. Maxson, Ponca City, Okla., assignors to The Dow Chemical Company, Midland, Mich., a corporation of Delaware
No Drawing. Filed Oct. 26, 1962, Ser. No. 233,420
7 Claims. (Cl. 99—171)

This application is a continuation-in-part of our prior application Serial No. 26,973, filed May 5, 1960, now abandoned.

This invention relates to a method of packaging viscous and gel-like materials and the product of manufacture obtained thereby and, more particularly, relates to a method of packaging viscous and gel-like materials under reduced pressure in alkenyl aromatic resinous containers.

By an alkenyl aromatic resin is meant a solid polymer of one or more polymerizable alkenyl aromatic compounds. The polymer or copolymer comprises, in chemically combined form, at least 60 percent by weight of at least one alkenyl aromatic compound having the general formula:

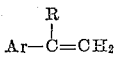

wherein Ar represents an aromatic hydrocarbon radical, or an aromatic halohydrocarbon radical of the benzene series, and R is hydrogen or the methyl radical. Examples of such alkenyl aromatic resins are the solid homopolymers of styrene, α-methylstyrene, ortho-methylstyrene, meta-methyl styrene, para-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methylmethacrylate, or acrylonitrile, etc.

In the past, alkenyl aromatic resinous containers, particularly when transparent, were unsatisfactory for the packaging under reduced pressure of viscous, gel-like, or high viscosity materials such as greases, cream cheese mayonnaise, jellies, jams, peanut butter, salad dressing, and the like. The viscous gel-like liquids used in the present invention are those whose flow characteristics are such that at normal storage temperatures small gas bubbles will not rise to the surface under the influence of gravity. Many of these commodities are packaged while hot to reduce the viscosity of the mix; or, they may be vacuum packed in order to eliminate bubbles or other gaseous voids. Hot and/or vacuum packing usually results in reduced pressure in the container under normal conditions. The term "normal conditions" as used herein refers to the usual storage temperatures encountered such as 40° Fahrenheit to 120° Fahrenheit at prevailing atmospheric pressure.

When high viscosity liquids or gels are packed in alkenyl aromatic resinous containers, bubbles appear after a period of time at an interface between the container and its contents. Bubble formation is particularly evident when transparent containers are employed. It was frequently presumed that the relatively high gas transmission rates of resinous materials were responsible for the appearances of gas bubbles or pockets on the interface between the container and its contents. A package exhibiting gas bubbles at the interface is not commercially acceptable since, as can readily be appreciated, such phenomenon spoils the aesthetic appeal of the package. It may even suggest to some that the contents are not fresh or have begun to deteriorate with the evolution of gas. Consequently, clear alkenyl aromatic resinous materials have not achieved general acceptance for use in the vacuum or reduced pressure packing of viscous materials.

Many benefits and advantages could be achieved if a clear alkenyl aromatic resinous container were provided that was capable of being employed in vacuum or reduced pressure packing operations. Clear alkenyl aromatic resinous containers are relatively low in cost, are extremely easily formed, and are available in a wide variety of shapes and sizes. The dies or other forming means utilized in the fabrication of such containers may be altered as desired with a minimum of time, mechanical facilities and expense.

It is an object of this invention to provide a method of packing viscous liquids in rigid alkenyl aromatic resinous containers without the subsequent formation of gas bubbles in the interface.

It is a further object of this invention to provide a degassed alkenyl aromatic resinous container suitable for vacuum packing viscous liquids.

It is yet another object of this invention to provide a commercially acceptable bubble-free package comprising an alkenyl aromatic resinous container for containing a viscous bubble-free material.

These and other objects, advantages and benefits may be obtained by (a) removing gases from at least a portion of the interior walls of a plastic container, (b) introducing a quantity of viscous materials into said container, and (c) closing said container under conditions which will produce a reduced pressure within such container under normal conditions, thereby obtaining a bubble free packaged material, an alkenyl aromatic resinous container substantially free of bubble-forming gases, having a viscous material therein and hermetic sealing means sealing said container for maintaining the package in an efficiently and effectively sealed condition.

Various shapes and types of rigid resinous containers are suitable for practice of the invention. Conventional glass shapes may be readily duplicated such as high and low cylindrical forms in either wide or narrow mouth styles. Plastic containers with or without ornamentation or labelling matter are readily prepared. The closures usually employed with glass containers such as screw-on or snap-on covers are readily utilized with plastic vessels as well as closures and techniques peculiar to plastics such as heat, solvent or adhesive seals. Such containers are readily formed by injection molding, vacuum forming, compression molding, and other similar well-known techniques for forming articles of plastic or resinous materials.

Ordinarily, despite contrary prior impressions, the gas and bubble formation within a clear alkenyl aromatic resinous container employed in the vacuum packing of viscous liquids does not appear to be dependent on the gas transmission rate through the wall. The gassing at the interface depends primarily upon the amount of gas contained in the alkenyl aromatic resinous material or plastic of the container. Subsequently, if a viscous material is packaged under vacuum in a gas containing vessel, the gas will slowly be drawn from the plastic body and appear as bubbles at the interface.

Suitable containers are prepared by a variety of methods. One method of preparing degassed containers is by injection molding in conventional injection molding apparatus which has been modified to the extent that a vacuum or reduced pressure is applied to the hopper or granular feed supply during the molding operation.

An alternate method is in employing a reduced pressure to the mold cavity during the forming operation.

Still another method which is successfully utilized is vacuum forming containers from a sheet which has been extruded from an extruder and vacuum applied to the hopper at a position intermediate between the ends of the extruder screw.

Other techniques may also be employed to fabricate relatively gas-free containers. These include placing the containers fabricated by conventional means in a chamber under reduced pressure for a period of time until sufficient gas is given off that bubbling will not occur when employed for vacuum packaging of viscous liquids. The evacuation time will depend primarily on the nature of the particular plastic from which the container has been fabricated, the pressure within the chamber and the temperature at which the vacuum treatment of the formed containers is carried out.

Alternately, containers fabricated by conventional methods may be employed in the practice of the invention if a suitable degassing operation is performed prior to the packing of the viscous material into the container. Heating of a fabricated container for a short period of time prior to filling is sufficient to drive out the gas and eliminate bubble formation of the interface between the inner container wall and the contents. The time and temperature required to treat a container will vary depending upon wall thickness, the type of resinous material employed, the degree of vacuum of reduced pressure in the packed container, and the particular technique employed in the fabrication of the resinous article. For example, polystyrene containers are adequately degassed by heating to about 190° Fahrenheit for a period of about 15 minutes.

It is critical that the amount of gas contained within the alkenyl aromatic resinous body of the container be reduced to at least 0.05 cubic centimeter per gram and advantageously to about 0.04 cubic centimeter per gram. With a gas content of about 0.05 cubic centimeter per gram oftentimes a few small bubbles may be observed, but not sufficient to be objectionable or readily obvious to the casual observer. However, when particularly clear gels are to be packaged such as apple jelly, no bubbling is observed when the gas content is about 0.04 cubic centimeter or less per gram of resinous container. The gas volume is expressed at a temperature of 0° centigrade and under a pressure of 760 millimeters of mercury absolute. A typical method of determining sorbed gas is to place the plastic material to be evaluated in a closed container and reduce the pressure to about $10^{-4}$ millimeters of mercury for a period of 68 hours. (A longer period is utilized if the plastic material is over about ⅛ of an inch in thickness.) The free volume remaining in the container is then determined by filling with helium. The vessel is then evaluated to a pressure of 1 micron of mercury absolute. Anhydrous air is admitted to the vessel until a pressure of one atmosphere is reached. When the desired pressure is reached, the system is closed and the pressure within the system is recorded versus time. When the pressure becomes constant, air is added at increments to return the system to atmospheric pressure and the total volume of air sorbed is calculated. From this information the volume of air under standard conditions, per gram of the alkenyl aromatic resinous material is readily determined. Generally, for convenience, the plastic material utilized has a thickness no greater than about ⅛ of an inch. However, greater thickness may be used if longer periods of time are taken in carrying out the determination.

Filling of the container should take place very soon after the container is exposed to normal atmospheric conditions. Otherwise, gas is apparently reabsorbed or re-adsorbed in or on the interior walls, and bubbles appear at the interface if such a container is employed for the vacuum packaging of viscous materials. Containers degassed by heating may be used immediately or stored for longer periods of time under reduced pressure or under a gaseous atmosphere which will be taken up by the viscous material being packed. The term "taken up" is employed in the sense which includes both chemical reaction, adsorption and absorption. Advantageously, for example, an acidic gel may be vacuum packed in containers stored under carbon dioxide. Interfacial bubbling will not occur on storage.

Example I

Three 11-ounce injection molded polystyrene tumblers are filled with freshly prepared grape jelly employing the following procedure. Grape jelly is prepared by heating two cups of commercial canned grape juice of the natural unsweetened variety with one and one-half pounds of sugar until the mixture boils. When the boiling point is reached, 93 milliliters of a fruit pectin preparation (commercially available under the trade name "Certo") are added. Additional heat is applied and the mixture brought to a vigorous boil and maintained thereat for a period of about one minute. The heat is removed from the mixture, the jelly mixture skimmed, and cooled to about 190° Fahrenheit. The mixture is then poured into the polystyrene tumblers which are previously treated by being stored for 4 days under a pressure of 1 millimeter of mercury absolute. The air content of the tumblers is less than 0.01 cubic centimeter per gram of polystyrene. The tumblers are then hermetically sealed and cooled to about 70° Fahrenheit to give an internal absolute pressure of about 400 millimeters' mercury. After storage for an extended period of time no formation of bubbles at the interface between the jelly and the container is found. The foregoing procedure is repeated with the exception that the evacuated containers are allowed to stand exposed to air at a temperature of about 25° centigrade and at normal atmospheric pressure for about 6 hours. The exposed tumblers contain about 0.055 cubic centimeter of air per gram of polystyrene. After storage for 16 hours at about 75° Fahrenheit a layer of fine bubbles is observed at the interface between the jelly and the containers even though no such bubbles are observed when the tumblers are initially filled and sealed.

Example II

Repetition of Example I with the exception that the air content of the containers is 0.05 cubic centimeter per gram results in a package which for most practical purposes is bubble free. A few bubbles are observed, but not sufficient to be readily obvious.

Example III

The procedure of Example I is repeated with the exception that the air content of the container is about 0.04 cubic centimeter per gram. No interfacial bubbling is observed.

Example IV

The procedure of Example I is followed with the exception that the polystyrene tumblers used are freshly prepared from deaerated polystyrene. Deaeration of the polystyrene is accomplished by heating and evacuating a container having polystyrene granular therein immediately prior to forming in an injection molding machine. No bubbles are observed after storage of the jelly-packed tumblers (which have a sorbed air content less than about 0.03 cubic centimeter of air per gram) for a period of about 16 hours at 25° centigrade at an internal pressure of about 400 millimeters of mercury absolute. By way of contrast, packing of jelly into polystyrene tumblers (containing about 0.075 cubic centimeter of air per gram) prepared in an identical manner with the exception that the polystyrene granules are not evacuated or otherwise deaerated, results in the appearance of fine bubbles at the interface between the tumblers and the grape jelly.

Example V

The procedure of Example I is repeated with the exception that injection molded polystyrene tumblers are utilized. These tumblers are not deaerated in any manner. The tumblers prior to filling are heated in an air oven for a period of about 6 hours. The oven is maintained within the temperature range of 185° to 195° Fahrenheit. Immediately upon removal from the oven the tumblers (containing less than about 0.02 cubic centimeter of air per gram) are packed with jelly and sealed. Storage of the jelly packed tumblers, having an internal pressure of about 400 millimeters' mercury, does not result in the appearance of any bubbles at the interface between the jelly and the container wall. By way of comparison, tumblers which are not heated in the air oven and tumblers which are permitted to stand exposed to the atmosphere for about 5 hours and sorb about 0.055 cubic centimeter of air per gram after treatment in the air oven, exhibit bubbles at the interface after storage for about 16 hours.

*Example VI*

Tumblers prepared from a copolymer of 30 parts of acrylonitrile and 70 parts of styrene are utilized to prepare jelly packages in accordance with Examples I–VI. Commensurate results are obtained.

In a manner similar to the foregoing examples, other viscous gel-like or high viscosity materials including greases such as the lubricating types and food stuffs such as cream cheese, mayonnaise, jellies, such as apple, mint and the like, jam, peanut butter, salad dressing and the like are packaged under reduced pressure in alkenyl aromatic resinous rigid containers containing less than about 0.04 cubic centimeter of air per gram of the resinous container provide similar beneficial bubble free results.

As is apparent from the foregoing specification, the method of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of vacuum packaging a viscous liquid within a rigid container to eliminate bubble formation at the interface between the liquid and the container which comprises introducing into a container consisting essentially of an alkenyl aromatic resin having sorbed therein less than about 0.05 cubic centimeter of gas per gram of resin, a quantity of viscous liquid and hermetically sealing said container under conditions which will result in a reduced pressure existing in the container under normal storage conditions.

2. A method of vacuum packaging viscous liquids within a rigid container to eliminate bubble formation at the interface between the liquid and the container which comprises preparing a plastic container from a substantially gas-free thermoplastic alkenyl aromatic resinous plastic mass containing not more than 0.05 cubic centimeter of gas per gram of resin, introducing a quantity of viscous liquid into said container and hermetically sealing said container under conditions which will result in a reduced pressure in said container under normal storage conditions.

3. The method of claim 2, wherein said container is prepared by injection molding of a plastic mass.

4. The method of claim 2, wherein said container is prepared by extruding an alkenyl aromatic resinous plastic mass containing not more than 0.05 cubic centimeter of gas per gram into a sheet and subsequently vacuum forming said sheet into said container.

5. A method of packaging jelly in a rigid container to eliminate bubble formation at the interface between the liquid and the container comprising introducing into a rigid container consisting essentially of an alkenyl aromatic resin, the container having sorbed therein less than 0.05 cubic centimeter of gas per gram of resin a quantity of grape jelly and immediately hermetically sealing said container under conditions which will result in a reduced pressure existing in said container under normal storage conditions.

6. The method of claim 1, wherein the container is sealed at a temperature above normal storage temperature and subsequently cooled to result in a reduced pressure therein.

7. The method of claim 1, wherein the viscous liquid within the container is subjected to a reduced pressure and subsequently hermetically sealed to maintain the reduced pressure therein.

References Cited by the Examiner

UNITED STATES PATENTS

| | | | |
|---|---|---|---|
| 2,304,461 | 12/42 | Knowles. | |
| 2,542,263 | 2/51 | Schultz | 264—327 |
| 2,799,589 | 7/57 | Grinstead | 99—171 |
| 2,876,492 | 3/59 | Frieder et al. | |
| 2,911,678 | 11/59 | Brunfeldt. | |
| 2,951,260 | 9/60 | Harrison et al. | |
| 3,054,679 | 9/62 | Bradford | 99—171 |

OTHER REFERENCES

Robertson, "India Rubber World," pages 80–84, Oct. 1952.

A. LOUIS MONACELL, *Primary Examiner.*